Patented Apr. 10, 1951

2,548,017

UNITED STATES PATENT OFFICE 2,548,017

SULFONIC ACID SURFACE ACTIVE AGENT
AND METHOD OF PREPARATION

Glen W. Hedrick, Glen Ellyn, Ill., assignor to
E. F. Houghton and Company, Philadelphia,
Pa., a corporation of Pennsylvania No Drawing. Application October 12, 1948,
Serial No. 54,207

11 Claims. (Cl. 260—470)

The present invention relates to novel surface active agents and more particularly, it relates to surface active agents having marked wetting properties, as well as other desirable properties, comprising a new type of chemical substance, namely, the water-soluble salts of a benzoyl sulpho propionic acid ester as more fully described hereinafter. This application is a continuation in part of application Serial No. 626,438, filed November 2, 1945, now abandoned.

The principal object of the invention is to provide surface active agents having outstanding wetting properties, which agents may be used wherever such properties are desired, for example, in processing textile fibres and fabrics, leather, paper, and other fibrous materials, in cleaning processes, such as general household cleaning, material cleaning, dishwashing, and the like, and in frothing, emulsifying, emulsion breaking, flotation, and other processes. The agents are especially useful to increase the water-absorptivity of fibrous or other materials and, therefore, the wetting agents of the invention may advantageously be used in the kier boiling of cotton, in the scouring of wool, in the boiling-off of rayon, in dyebaths, in the production of "Sanforized" cotton, in the fat-liquoring of leather, in the treatment of paper, and the like.

Other objects, including the provision of a novel method of producing the wetting agents of the invention, will be apparent from a consideration of the specification and the claims.

As indicated above, the wetting agents of the present invention comprise the water-soluble salts of the benzoyl sulpho propionic acid esters, the benzoyl radical being defined as a radical of the type RCO— where R is a phenyl or substituted phenyl radical of the type hereinafter set forth.

The surface active agents of the present invention are represented by the formula:

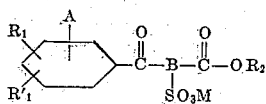

where $R_1$ is selected from the group consisting of hydrogen, phenyl, cyclohexyl, and alkyl groups containing from 1 to 9 carbon atoms; where $R'_1$ is selected from the group consisting of hydrogen and alkyl groups containing from 1 to 9 carbon atoms when $R_1$ is selected from the group consisting of hydrogen and said alkyl groups, and where $R'_1$ is hydrogen when $R_1$ is selected from the group consisting of phenyl and cyclohexyl radicals; where A is selected from the group consisting of hydrogen and chlorine except when $R'_1$ is an alkyl group, in other words, A is selected from the group consisting of hydrogen and chlorine when $R_1'$ is hydrogen, and is hydrogen when $R'_1$ is an alkyl group; where $R_2$ is selected from the group consisting of alkyl groups containing from 1 to 9 carbon atoms, phenethyl, methylcyclohexyl and cyclohexyl groups; where B is an ethylene group; where M is a cation providing water-solubility to the product; and where the total number of carbon atoms of $R_2$ plus carbon atoms in the substituted groups ($R_1$ and/or $R'_1$ on the phenyl nucleus is at least 8 but not more than 16.

Thus, in the above formula, the group

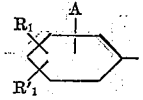

may be written as X— which represents a phenyl derivative selected from the group consisting of phenyl, monoalkyl phenyl, dialkyl phenyl, monochlorophenyl, monoalkyl monochlorophenyl, phenyl phenyl, phenyl chlorophenyl, cyclohexyl phenyl, and cyclohexyl chlorophenyl, wherein the alkyl groups mentioned contain from 1 to 9 carbon atoms, and wherein the number of carbon atoms supplied by substituted groups attached to the phenyl nucleus, whether an alkyl group or groups, a phenyl or cyclohexyl group, provide, with carbon atoms supplied by $R_2$, a total of at least 8 but not more than 16 carbon atoms.

In the above formula, no attempt has been made to indicate to which of the two carbon atoms in the ethylene (B) group the sulpho group (—$SO_3$—M) is attached. The most practical chemical processes, however, for introducing the sulpho group into this ethylene linkage are believed to produce mixtures rather than pure alpha or pure beta derivatives. Generally, while the alpha derivative is believed to predominate, the location of the sulpho group is immaterial since it must exert a similar hydrophilic action on the molecule either in the alpha or the beta position, and it is to be understood that both the alpha and beta compounds and mixtures thereof are within the scope of the invention.

As pointed out in connection with the formula, M is a cation rendering the compound water-soluble, for example, an alkali metal such as sodium or potassium, the ammonium radical, and the like.

The products of the present invention thus embody not only a benzoyl or chlorbenzoyl group but also a definite number of "exterior" or "external" carbon atoms in the various R groups. As stated, these external carbon atoms must total at least 8 and not more than 16, but no one group thereof can contain more than 9 carbon atoms, some or all of these external carbon atoms may be provided by $R_2$, that is by the alkyl ester group or by the cyclic ester group selected from the group consisting of the phenethyl, methylcyclohexyl, and cyclohexyl groups. Some of these external carbon atoms may be provided by a substituted group or groups attached to the phenyl nucleus, and as indicated, these substituted groups may be alkyl groups containing from 1 to 9 carbon atoms, or cyclic groups selected from the group consisting of the phenyl and cyclohexyl groups. When any of the various R groups is an alkyl group, it is relatively immaterial from the standpoint of the present invention whether it is a straight or branched chain alkyl group. A chlorine atom may also be attached to the phenyl nucleus without altering the properties of the compound significantly. Since no one group, whether attached to the phenyl nucleus or forming the ester group contains more than 9 carbon atoms, and since the total number of "external" carbon atoms ranges from 8 to 16, for each ester group ($R_2$) employed, there is a definite range of carbon atoms that may be present in the groups attached to the phenyl nucleus and vice versa. For example, if there are no groups containing carbon atoms attached to the phenyl nucleus (i. e.

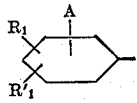

is phenyl or monochlorophenyl) the ester groups are restricted to the octyl, nonyl, and phenethyl groups; while if, for example, a nonyl group and a hexyl group are attached to the phenyl nucleus (i. e.

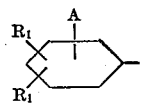

is hexylnonyl phenyl) the ester is restricted to the methyl group.

While numerous specific compounds may be prepared by the methods hereinafter described corresponding to the formula given for the compounds of the invention, they will possess marked wetting properties, making them available for use as surface active agents in the various industrial fields. This is because such compounds embody the basic structure hereinbefore set forth and contain external carbon atoms within the stated limits, and the specific examples hereinafter set forth demonstrate the fact that such compounds possess marked wetting properties.

The compounds of the invention possessing wetting properties to the highest degree are those corresponding to the formula:

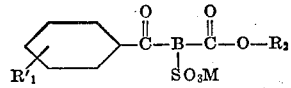

where $R'_1$ is an alkyl group containing from 1 to 9 carbon atoms, where $R_2$ is an alkyl group containing from 1 to 9 carbon atoms, where B and M are as stated above, and where the total number of carbon atoms supplied by $R_2$ and $R'_1$ is from 10 to 14. Preferably, $R'_1$ contains from 3 to 6 carbon atoms, $R_2$ contains from 4 to 9 with a total of external carbon atoms of from 10 to 14, and M is sodium.

The products of the invention may be readily and economically prepared by condensing the desired phenyl derivative reactive in a Friedel-Crafts acylation type of reaction, with the anhydride of a four carbon atom dicarboxylic aliphatic acid, i. e. maleic anhydride or succinic anhydride; esterifying the resulting acid; and then converting the ester into the sulpho derivative, as will be further discussed hereinafter. Another, but not preferred, method of preparing the products of the present invention is by condensing a half ester-half acid chloride of the four carbon atom dibasic acid with the phenyl derivative to provide the ester, and then converting the ester into the sulpho derivative.

In preparing the benzoyl derivative, the desired phenyl derivative furnishing not only the phenyl or monochlorophenyl nucleus, but also any substituted alkyl, phenyl, or cyclohexyl group, is reacted by a Friedel-Crafts acylation reaction with a molar equivalent of the anhydride. The phenyl derivative may be obtained from any source, for instance from coal tar, petroleum or from synthetic processes. For example, in the case of alkylated phenyl derivatives, these may be obtained by condensing benzene with an alkyl halide or with an aliphatic olefin by a preliminary Friedel-Crafts alkylation reaction.

Examples of the phenyl derivatives that may be used in the preparation of the benzoyl derivatives in accordance with the present inventions are: benzene; monochlorobenzene; the monoalkyl benzenes such as toluene, isopropyl benzene (cumene), secondary butyl benzene, n-butyl benzene, amyl benzene, hexyl benzene, n-octyl benzene, 2-octyl benzene, 1-methyl 1-ethylamyl-benzene, nonyl benzene, 1-propyl 1-methylamyl-benzene, and the like; the dialkyl benzenes such as xylene, methyl isopropyl benzene (cymene), secondary butyl toluene, diethyl benzene, dibutyl benzene, diamyl benzene, nonyl toluene, nonyl secondary butyl benzene, and the like; the monoalkyl monochlorobenzenes such as chlorotoluene, chlorocumene, secondary butyl chlorobenzene, nonyl chlorobenzene, and the like; phenyl benzene, phenyl chlorbenzene, cyclohexyl benzene, and cyclohexyl chlorbenzene.

The anhydride of the four carbon atom dicarboxylic aliphatic acid may be the unsaturated maleic anhydride or the saturated succinic anhydride. When maleic anhydride is employed, the benzoyl compound prior to sulphonation is a benzoyl acrylic acid ester. Upon sulphite addition, the double bond is saturated and the product is a water-soluble salt of a benzoyl sulpho propionic acid ester, wherein the $SO_3M$ group has become attached to one of the carbon atoms of the —CH=CH— group, and a hydrogen atom to the other. In the case of succinic anhydride, the benzoyl derivative of propionic acid is formed as a result of the Friedel-Crafts reaction and a hydrogen atom attached either to the alpha or beta carbon atom must be substituted by the sulpho group, as hereinafter described.

The reaction between the phenyl derivative and the anhydride to form the corresponding benzoyl acrylic or propionic acid is brought about, as has been stated above, by a Friedel-Crafts acylation reaction, and any of the various expedients used in that type of reaction may be employed in the production of the benzoyl compound. Advantageously, the condensation is brought about by condensing the phenyl derivative with approximately a molar equivalent of the anhydride in a suitable solvent with anhydrous or substantially anhydrous aluminum chloride. While the solvent employed may, in the case of relatively low boiling phenyl derivatives, be an excess of the phenyl derivative, the use of a suitable inert solvent such as carbon disulphide, orthodichlorobenzene, methylene chloride, ethylene chloride, and tetrachloroethane is preferred.

The phenyl derivative and the anhydride may be mixed with the solvent and the aluminum chloride added thereto, preferably gradually over a period of time, or the phenyl derivative may be mixed with a portion or all of the aluminum chloride and the anhydride and solvent may then be added, preferably gradually, followed by the addition of further amounts of aluminum chloride, if required. Other procedures for bringing together the phenyl derivative, the anhydride, the solvent, and the aluminum chloride may of course be used, if desired. For example, the aluminum chloride, anhydride, and solvent may be mixed and the phenyl derivative gradually added thereto. The reaction, at least at the start, is exothermic and hydrogen chloride is evolved as the reaction proceeds. The reacting mixture is generally maintained at a temperature in the range from about 20° C. to about 65° C. by cooling at the start and by heating subsequently if necessary, and it is advantageous to agitate the mixture during the reaction.

When the condensation is completed, which may be determined by cessation of the evolution of the hydrogen chloride, the mass may be poured into ice, water, and a small amount of mineral acid, keeping the mass cold as is the usual practice in the type of reaction, and the mixture may be agitated until the aluminum chloride complex is decomposed. The condensation product which is in solution in the solvent may then be separated from the aqueous phase and washed with water and mineral acid to remove the salts of aluminum.

The benzoyl acrylic or propionic acid may be isolated by either extracting it from the solvent with a warm 5% soda ash solution or by removing the solvent by distillation. The acid may be purified by dissolving it in a solution of a suitable alkali, such as soda ash, filtering to remove any insoluble material and precipitating the acid by the addition of mineral acid.

In one procedure, the phenyl derivative is dissolved in an inert solvent and about one molecular equivalent of maleic anhydride is added to the solution. The mixture is heated to a temperature at which the aluminum chloride complex remains dispersed, for example, to about 40° C., and is maintained between that temperature and about 50° C. during the reaction. The aluminum chloride (about 2 molecular equivalents) is added gradually, for example, in portions during the reaction, and the mass is agitated during the reaction. When the reaction is complete, which may require several hours—for example six hours—the aluminum chloride complex is decomposed and the acid isolated as above described.

In a more preferred procedure, the aluminum chloride, anhydride, and a chlorinated solvent are mixed, and the mixture is agitated and becomes uniform. The phenyl derivative is gradually added at a temperature between about 40° C. and about 50° C., and after the addition is completed the mixture is stirred for a short period at a temperature between about 40° C. and about 60° C. The aluminum chloride complex is decomposed and the acid isolated as above-described.

The benzoyl acrylic or propionic acid is esterified with a compound providing the desired $R_2$ group, and the resulting ester is then converted to the sulpho derivative. The ester of the acid may be prepared by any of the suitable esterifying reactions.

In one type of method, the ester may be formed by reacting the acid with one molecular equivalent of the alcohol corresponding to the ester desired in the presence of a solvent and an esterifying catalyst such as concentrated sulphuric acid, benzene- or toluene-sulphonic acid. Preferably, the solvent is one which like toluene, boils slightly above the boiling point of water. The mixture of the benzoyl acrylic or propionic acid, the alcohol, the solvent and the esterification catalyst are boiled and the water formed by the esterification reaction is removed. After the esterification reaction has been completed, the ester, which is in solution in the solvent, may be washed with water, followed in some cases by dilute alkali to remove any unconverted acid and the traces of catalyst. The ester may be isolated by removing the solvent by steam distillation, distillation at atmospheric pressure, or by evaporation in vacuo.

In another type of esterification procedure to produce compounds in which $R_2$ is a small alkyl group, the ester of the benzoyl acrylic or propionic acid may be obtained by dissolving the acid in a solvent such as toluene, benzene, chlorbenzene, orthodichlorobenzene, carbon tetrachloride, tetrachlorethane, and the like. The acid is then converted into a salt and the ester formed by reaction an alkyl sulphate, the alkyl group of which corresponds to the ester desired. In such a process, the salt is advantageously formed by the addition of a slurry of soda ash in water, and in such a case, foaming occurs due to the evolution of carbon dioxide, and the mass becomes thick and has the appearance of a clear gel. The reaction between the salt of the acid and the alkyl sulphate is oxothermic and is completed within a few minutes, as shown by the fact that a sample mixed with water separates readily into two layers. The mass obtained as the result of the reaction is made acid by the addition of mineral acid, is washed with water to remove the salts and the ester is obtained upon removal of the solvent by steam or vacuum distillation.

The benzoyl acrylic or propionic acid ester may be converted into the sulpho derivative by any process by which the —$SO_3$—M group may be attached to one of the carbon atoms of the vinylene or ethylene chain of the acrylic or propionic acid ester. Preferably, when a benzoyl acrylic acid ester is employed, the sulphonation is brought about by reacting the ester with a bisulphite such as sodium, potassium, or ammonium bisulphite. In the sulphonation reaction, the ester is mixed with the bisulphite dissolved in water or other solvent, for example, a mixture of equal parts of water and ethyl alcohol. The bisulphite employed is sufficient to convert the ester into the sodium or other salt of the sulphonic acid, the use of a slight excess of the bisulphite often being advantageous. The mixture is advantageously heated in a closed container equipped with an agitator until the ester becomes completely soluble in water. The temperature of heating will depend on the particular ester being treated and usually a temperature between about 80° C. and 110° C. will be employed, and in many instances it will be desirable to heat the mixture to boiling. The ester is rendered completely soluble in water by this treatment and the product formed is the sulphonic acid salt of the cation of the bisulphite. Thus, as stated in connection with the formula, —M may be any cation which provides water-solubility, for example, an alkali metal ion, ammonium radical, or the like.

Referring to the saturated benzoyl propionic acid ester, it may be first converted into a halogenated derivative, for example, a bromo compound, prior to sulphonation. In such conversion process, the ester is advantageously dissolved in a solvent and a small amount of a halogenating catalyst such as phosphorus trichloride is added. The halogen, for example, bromine, is then brought into contact with the solution, for instance, by adding liquid bromine drop-by-drop to the solution. Hydrogen halide is liberated and the reaction is completed in a short time. The halogenated derivative is isolated by evaporation of the solvent. The halogenated derivative thus prepared may then be sulphonated by reacting the halogen derivative with a sulphite, for example, sodium or potassium sulphite, to replace the halogen atom of the compound with the —SO$_3$—M group. Advantageously, the reaction is brought about by refluxing an aqueous mixture of the reactants until the reaction has progressed to completion. As in the case of the products obtained by the previously described method of sulphonation, the sulphonated product may be provided with the desired cation represented by M.

In order to illustrate the invention further, the following specific examples are given for the preparation of the compounds of the present invention. Four different procedures were employed in preparing the compounds of the examples, three of which are illustrated below as Methods A, B, and C, respectively. Each of the numerical examples, from 1 to 47, inclusive, were made according to one of these three methods and to avoid repetition of the details of the procedures, each of these examples is designated as to which method was followed. In each case, a measure of the compound's surface activity is given by showing wetting speeds at various concentrations in water determined by the time required to wet out a 5 gram skein of raw cotton yarn at 100° F. according to the standard Draves method. Example 48 illustrates the fourth method.

METHOD A

*The preparation of the methyl ester of 2-nonylbenzoyl sulpho propionic acid, sodium salt*

To a mixture of 49 g. (½ mol) of maleic anhydride and 105 g. aluminum chloride, there are added 90 cc. ethylene chloride. The suspension is agitated and water cooled. After most of the solids have dissolved, 102 g. (½ mol) of 2-nonyl benzene are added slowly. After the addition the mixture is stirred for 30 minutes at 50° C. The material is then cooled and decomposed with a mixture of 450 g. crushed ice, 50 cc. of 66% sulphuric acid and 15 cc. isopropanol. After most of the dark brown complex has been decomposed, the mixture is heated to reflux temperature. After five minutes of refluxing, the material is split. The lower layer is discarded. The upper layer is then washed twice with 70 cc. portions of 66% sulphuric acid. 17 cc. of methanol and 12 cc. of concentrated sulphuric acid are added to the ethylene chloride solution of the maleic anhydride condensate and the material is refluxed for 45 minutes. The lower layer is then drawn off and another 12 cc. of methanol and 8 cc. of concentrated sulphuric acid are added, and refluxing is continued for another 90 minutes. The lower layer is again drawn off and the solvent is distilled off from the organic solution. The last traces of solvent are removed under vacuum and heating is continued until the temperature within the liquid has risen to 125° C. The liquid is then allowed to cool somewhat and a solution of 1 g. sodium hydroxide and 55 g. sodium bisulphite in 250 cc. of water is added to the oil. The mixture is stirred and heated to 95° C. The temperature is maintained there for one hour although the sulphonation reaction is usually completed after ten minutes. The product gave a wetting speed of 32 seconds at a concentration of .1%.

METHOD B

*The preparation of the 2-ethylhexyl ester of sec. butylbenzoyl sulpho propionic acid, sodium salt*

To a mixture of 49 g. (½ mol) maleic anhydride and 105 g. aluminum chloride, there are added 90 cc. of ethylene chloride. The suspension is agitated and water cooled. After most of the solids have dissolved, 67 g. (½ mol) sec. butylbenzene are added slowly. After the addition, the mixture is stirred for 30 minutes at 50° C. The material is then cooled and decomposed with a mixture of 500 g. crushed ice, 100 cc. 66% sulphuric acid and 65 g. (½ mol) 2-ethylhexanol. The mixture is stirred for 90 minutes at room temperature. The lower layer is then drawn off. 1 cc. of concentrated sulphuric acid is added to the organic layer which is then refluxed through a constant water separator for 2 hours or longer until practically all of the acid has been esterified. The solvent is distilled off until the temperature within the oil has reached 110° C. A solution of 52 g. sodium bisulphite and 1 g. sodium hydroxide in 110 cc. of water is added to the oil. The agitated mixture is heated to 105° C. and is maintained there for 15 minutes, after which time sulphonation is complete. The isolated product at a concentration of 0.1% in water, provided a wetting speed of 2 seconds.

METHOD C

*The preparation of 2-ethylhexyl ester of tert. butylbenzoyl sulpho propionic acid, sodium salt*

To a cooled and stirred mixture of 49 g. (½ mol) maleic anhydride, 67 g. (½ mol) tert. butylbenzene and 300 cc. o-dichlorobenzene, there are added gradually in small portions 140 g. aluminum chloride. The temperature is allowed to rise slowly to 50° C.–60° C. where it is maintained until no more hydrogen chloride is given off. The material is decomposed by pouring it over 1 kg. of crushed ice to which 100 cc. of concentrated sulphuric acid has been added. The mixture is stirred until the aluminum chloride complex has been broken up completely. Then the lower layer is drawn off and the solvent is steam-distilled off from the upper layer. The steam distillation residue is taken up in a mixture of 200 cc. of toluene and 70 g. 2-ethylhexanol and any lower layer which may be formed is drawn off. The solution is then refluxed with 10 cc. of concentrated sulphuric acid, the distillate passing through a constant water separator with the toluene being returned to the mixture, until practically all of the acid is esterified which requires about 4 hours. The bottom layer is then drawn off and any mineral acid present in the oil is neutralized. The toluene is steam-distilled off. The ester is then sulphonated as described under Method B. The product gaves a wetting speed of 5 seconds at a concentration of 0.1%.

Other water-soluble salts instead of the sodium salts, such as the potassium or ammonium salts, may be prepared by employing potassium or ammonium bisulphite in the above methods in place of sodium bisulphite. These other water-soluble salts exhibit strong surface active properties, and may be used in a manner similar to the sodium salts.

In the following examples, the sodium salt of the benzoyl sulpho propionic acid esters is prepared, but as previously set forth, other water-soluble salts such as the potassium or the ammonium salts may be prepared by analogous procedures.

EXAMPLE 1

The salt of the 2-ethyl hexyl ester of benzoyl sulpho propionic acid was prepared following Method C, by first condensing benzene with maleic anhydride. The benzoyl acrylic acid thus formed was esterified with 2-ethyl hexyl acohol, and the resulting ester was reacted with sodium bisulphite to form the sulpho derivative. At a concentration of .2%, the compound gave a wetting speed of only 7 seconds, and at .1% a wetting speed of 120 seconds.

EXAMPLE 2

The salt of the 2-ethyl hexyl ester of chlorobenzoyl sulpho propionic acid was prepared following Method B, by first condensing mono chloro benzene with maleic anhydride. The chlorobenzoyl acrylic acid thus formed was esterified with 2-ethyl hexyl alcohol and the resulting ester was reacted with sodium bisulphite to form the sulpho derivative. This compound provided a wetting speed of 92 seconds at a concentration of only .05%.

EXAMPLE 3

The salt of the 2-ethyl hexyl ester of toluoyl sulpho propionic acid was prepared according to Method B, by first condensing toluene with maleic anhydride. The toluoyl acrylic acid thus formed was esterified with 2-ethyl hexyl alcohol and the resulting ester was reacted with sodium bisulphite to form the sulpho derivative. This compound provided a wetting speed of 27 seconds at a concentration of .1%.

EXAMPLE 4

The salt of the 2-ethyl hexyl ester of chlorotoluoyl sulpho propionic acid was prepared following Method B, by first condensing monochloro toluene with maleic anhydride. The chlorotoluoyl acrylic acid thus formed was esterified with 2-ethyl hexyl alcohol and the resulting ester was reacted with sodium bisulphite to form the sulpho derivative. At a concentration of only .05%, it provided a wetting speed of 15.5 seconds, and at .03%, 131 seconds.

EXAMPLE 5

The salt of the n-hexyl ester of xyloyl sulpho propionic acid was prepared following Method B, by first condensing xylene with maleic anhydride. The xyloyl acrylic acid thus formed was esterified with n-hexyl alcohol and the resulting ester was reacted with sodium bisulphite to form the sulpho derivative. This compound provided a wetting speed of 81 seconds at a concentration of 1%.

EXAMPLE 6

The salt of the 2-ethyl hexyl ester of xyloyl sulpho propionic acid was prepared following Method B, by first condensing xylene with maleic anhydride. The xyloyl acrylic acid thus formed was esterified with 2-ethyl hexyl alcohol and the resulting ester was reacted with sodium bisulphite to form the sulpho derivative. This compound provided a wetting speed of 48 seconds at a concentration of only .05%.

EXAMPLE 7

The salt of the 2-ethylbutyl ester of cumenoyl (isopropyl benzoyl) sulpho propionic acid was prepared following Method C, by first condensing cumene with maleic anhydride. The cumenoyl acrylic acid thus formed was esterified with 2-ethyl butyl alcohol and the resulting ester was reacted with sodium bisulphite to form the sulpho derivative. A wetting speed of 20 seconds was provided by this compound at a concentration of .2%, and 165 seconds at .1%.

EXAMPLE 8

The salt of the n-hexyl ester of cumenoyl sulpho propionic acid was prepared following Method C, by first condensing cumene with maleic anhydride. The cumenoyl acrylic acid thus formed was esterified with n-hexyl alcohol, and the resulting ester was reacted with sodium bisulphite to form the sulpho derivative. At a concentration of .2%, this compound provided a wetting speed of 6 seconds, and at .1%, a wetting speed of 120 seconds.

EXAMPLE 9

The salt of the n-heptyl ester of cumenoyl sulpho propionic acid was prepared following Method C, by first condensing cumene with maleic anhydride. The cumenoyl acrylic acid thus formed was esterified with n-heptyl alcohol, and the resulting ester was reacted with sodium bisulphite to form the sulpho derivative. It gave a wetting speed of 5 seconds at a concentration of .2%, and 28 seconds at .1%.

EXAMPLE 10

The salt of the 2-ethyl hexyl ester of cumenoyl sulpho propionic acid was prepared following Method C, by first condensing cumene with maleic anhydride. The cumenoyl acrylic acid thus formed was esterified with 2-ethyl hexyl alcohol and the resulting ester was reacted with sodium bisulphite to form the sulpho derivative. It gave a wetting speed of 24 seconds at a concentration of only .05%, and 90 seconds at only .025%.

EXAMPLE 11

The salt of the 2-ethyl hexyl ester of chlorocumenoyl sulpho propionic acid was prepared following Method B, by first condensing monochlorocumene with maleic anhydride. The chlorocumenoyl acrylic acid thus formed was esterified with 2-ethyl hexyl alcohol and the resulting ester was reacted with sodium bisulphite to form the sulpho derivative. It gave a wetting speed of 29 seconds at a concentration of .03%, and 153 seconds at .02%.

EXAMPLE 12

The salt of the isoamyl ester of n-butylbenzoyl sulpho propionic acid was prepared following Method B, by first condensing n-butyl benzene with maleic anhydride. The n-butyl benzoyl acrylic acid thus formed was esterified with isoamyl alcohol, and the resulting ester was reacted with sodium bisulphite to form the sulpho derivative. It gave a wetting speed of 30 seconds at a concentration of only .05%, and 45 seconds at only .03%.

EXAMPLE 13

The salt of the n-octyl ester of sec. butylbenzoyl sulpho propionic acid was prepared using Method B, by first condensing sec. butyl benzene with maleic anhydride. The sec. butyl benzoyl acrylic acid thus formed was esterified with n-octyl alcohol and the resulting ester was reacted with sodium bisulphite to form the sulpho derivative. It gave a wetting speed of 33 seconds at a concentration of only .02%, and 67 seconds at only .015%.

EXAMPLE 14

The salt of the 2-ethyl hexyl ester of 1-butylbenzoyl sulpho propionic acid was prepared following Method C, by first condensing 1-butyl benzene with maleic anhydride. The butylbenzoyl acrylic acid thus formed was esterified with 2-ethyl hexyl alcohol, and the resulting ester was reacted with sodium bisulphite to form the sulpho derivative. It gave a wetting speed of 80 seconds at a concentration of only .025%.

EXAMPLE 15

The salt of the 2-ethyl hexyl ester of cymenoyl (1-methyl-4-isopropyl benzoyl) sulpho propionic acid was prepared following Method B, by first condensing cymene with maleic anhydride. The cymenoyl acrylic acid thus formed was esterified with 2-ethyl hexyl alcohol, and the resulting ester was reacted with sodium bisulphite to form the sulpho derivative. It gave a wetting speed of 20 seconds at a concentration of .03%, and 127 seconds at .02%.

EXAMPLE 16

The salt of the 2-ethyl hexyl ester of sec. butyl chlorobenzoyl sulpho propionic acid was prepared following Method B, by first condensing sec.-butylchlorobenzene with maleic anhydride. The butyl chlorbenzoyl acrylic acid thus formed was esterified with 2-ethyl hexyl alcohol, and the resulting ester was reacted with sodium bisulphite to form the sulpho derivative. It gave a wetting speed of 53 seconds at a concentration of only .02%.

EXAMPLE 17

The salt of the n-butyl ester of sec. amylbenzoyl sulpho propionic acid was prepared following Method B, by first condensing sec. amyl benzene with maleic anhydride. The amylbenzoyl acrylic acid thus formed was esterified with n-butyl alcohol and the resulting ester was reacted with sodium bisulphite to form the sulpho derivative. It gave a wetting speed of 140 seconds at a concentration of .05%.

EXAMPLE 18

The salt of the 2-ethyl hexyl ester of sec. amylbenzoyl sulpho propionic acid was prepared following Method B, by first condensing sec. amyl benzene with maleic anhydride. The amylbenzoyl acrylic acid thus formed was esterified with 2-ethyl hexyl alcohol, and the resulting ester was reacted with sodium bisulphite to form the sulpho derivative. It gave a wetting speed of 25 seconds at a concentration of only .02%.

EXAMPLE 19

The salt of the n-nonyl ester of n-heptylbenzoyl sulpho propionic acid was prepared following Method B, by first condensing n-heptylbenzene with maleic anhydride. The heptylbenzoyl acrylic acid thus formed was esterified with n-nonyl alcohol, and the resulting ester was reacted with sodium bisulphite to form the sulpho derivative. At a concentration of .1%, the compound gave a wetting speed of 35 seconds.

EXAMPLE 20

The salt of the n-heptyl ester of nonylbenzoyl (1,3,5 trimethyl hexylbenzoyl) sulpho propionic acid was prepared following Method B, by first condensing nonyl (1,3,5 trimethylhexyl benzene) benzene with maleic anhydride. The nonyl benzoyl acrylic acid thus formed was esterified with n-heptyl alcohol and the resulting ester was reacted with sodium bisulphite to form the sulpho derivative. It gave a wetting speed of 28 seconds at a concentration of .1%.

EXAMPLE 21

The salt of the methyl ester of n-heptylbenzoyl sulpho propionic acid was prepared following Method A, by first condensing n-heptylbenzene with maleic anhydride. The heptylbenzoyl acrylic acid thus formed was esterified with methyl alcohol, and the resulting ester was reacted with sodium bisulphite to form the sulpho derivative. At a concentration of .1%, the compound gave a wetting speed of 45 seconds.

EXAMPLE 22

The salt of the n-hexyl ester of 2-nonyl chlorobenzoyl sulpho propionic acid was prepared following Method B, by first condensing 2-nonyl chlorobenzene with maleic anhydride. The nonyl chlorobenzoyl acrylic acid thus formed was esterified with n-hexyl alcohol, and the resulting ester was reacted with sodium bisulphite to form the sulpho derivative. It gave a wetting speed of 35 seconds at a concentration of .15%.

EXAMPLE 23

The salt of the methyl ester of 2-nonyltoluoyl sulpho propionic acid was prepared following Method A, by first condensing 2-nonyl toluene with maleic anhydride. The nonyl toluoyl acrylic acid thus formed was esterified with methyl alcohol, and the resulting ester was reacted with sodium bisulphite to form the sulpho derivative. It gave a wetting speed of 7 seconds at a concentration of 0.2%.

EXAMPLE 24

The salt of the 2-ethyl hexyl ester of sec.-butyl toluoyl sulpho propionic acid was prepared following Method B, by first condensing sec.-butyl toluene with maleic anhydride. The sec.-butyl toluoyl acrylic acid thus formed was esterified with 2-ethyl hexyl alcohol, and the resulting ester was reacted with sodium bisulphite to form the sulpho derivative. It gave a wetting speed of instantaneous at a concentration of .2%.

EXAMPLE 25

The salt of the ethyl ester of diamyl benzoyl sulpho propionic acid was prepared following Method A, by first condensing diamyl benzene (technical di-sec. amyl benzene) with maleic anhydride. The diamyl benzoyl acrylic acid thus formed was esterified with ethyl alcohol, and the resulting ester was reacted with sodium bisulphite to form the sulpho derivative. It gave a wetting speed of 10 seconds at a concentration of .2%, and 45 seconds at .1%.

EXAMPLE 26

The salt of the hexyl ester of diamyl benzoyl sulpho propionic acid was prepared following Method C, by first condensing diamyl benzene (technical di-sec. amyl benzene) with maleic anhydride. The diamyl benzoyl acrylic acid thus formed was esterified with hexyl alcohol, and the resulting ester was reacted with sodium bisulphite to form the sulpho derivative. It gave a wetting speed of 10 seconds at a concentration of .2%.

EXAMPLE 27

The salt of the n-propyl ester of nonyl 1,3,5 trimethyl hexyl) secondary butylbenzoyl sulpho propionic acid was prepared following Method A, by first condensing nonyl 1,3,5 trimethyl hexyl) secondary butyl benzene with maleic anhydride. The nonyl secondary butyl benzoyl acrylic acid thus formed was esterified with n-propyl alcohol, and the resulting ester was reacted with sodium bisulphite to form the sulpho derivative. At a concentration of .05%, it gave a wetting speed of 46 seconds.

EXAMPLE 28

The salt of the n-nonyl ester of diethylbenzoyl sulpho propionic acid was prepared following Method B, by first condensing diethylbenzene with maleic anhydride. The diethylbenzoylacrylic acid thus formed was esterified with n-nonyl alcohol and the resulting ester was treated with sodium bisulphite to form the sulpho derivative. At a concentration of .05%, the compound gave a wetting speed of 20 seconds.

EXAMPLE 29

The salt of the ethyl ester of phenylbenzoyl sulpho propionic acid was prepared following Method A, by first condensing phenylbenzene with maleic anhydride. The phenylbenzoyl acrylic acid thus formed was esterified with ethyl alcohol, and the resulting ester was reacted with sodium bisulphite to form the sulpho derivative. At a concentration of 0.2%, the compound gave a wetting speed of 70 seconds.

EXAMPLE 30

The salt of the 2-ethyl hexyl ester of phenyl benzoyl sulpho propionic acid was prepared following Method B, by first condensing phenyl benzene with maleic anhydride. The phenyl benzoyl acrylic acid thus formed was esterified with 2-ethyl hexyl alcohol, and the resulting ester was reacted with sodium bisulphite to form the sulpho derivative. At a concentration of .05%, it gave a wetting speed of 11 seconds.

EXAMPLE 31

The salt of the n-nonyl ester of phenylbenzoyl sulpho propionic acid was prepared following Method B, by first condensing phenylbenzene with maleic anhydride. The phenylbenzoyl acrylic acid thus formed was esterified with n-nonyl alcohol, and the resulting ester was reacted with sodium bisulphite to form the sulpho derivative. At a concentration of 0.05%, this compound gave a wetting speed of 35 seconds.

EXAMPLE 32

The salt of the ethyl ester of cyclohexylbenzoyl sulpho propionic acid was prepared following Method A, by first condensing cyclohexylbenzene with maleic anhydride. The cyclohexylbenzoyl acrylic acid thus formed was esterified with ethyl alcohol, and the resulting ester was reacted with sodium bisulphite to form the sulpho derivative. At a concentration of 0.3%, the compound gave a wetting speed of 30 seconds.

EXAMPLE 33

The salt of the 2-ethylhexyl ester of cyclohexyl benzoyl sulpho propionic acid was prepared following Method B, by first condensing cyclohexyl benzene with maleic anhydride. The cyclohexyl benzoyl acrylic acid thus formed was esterified with 2-ethyl hexyl alcohol, and the resulting ester was reacted with sodium bisulphite to form the sulpho derivative. At a concentration of .1%, it gave a wetting speed of 8 seconds.

EXAMPLE 34

The salt of the n-nonyl ester of cyclohexylbenzoyl sulpho propionic acid was prepared by Method B, by first condensing cyclohexylbenzene with maleic anhydride. The cyclohexylbenzoyl acrylic acid thus formed was esterified with n-nonyl alcohol, and the resulting ester was reacted with sodium bisulphite to form the sulpho derivative. At a concentration of 0.1%, it gave a wetting speed of 35 seconds.

EXAMPLE 35

The salt of the cyclohexyl ester of ethylbenzoyl sulpho propionic acid was prepared by Method B, by first condensing ethyl benzene with maleic anhydride. The ethylbenzoyl acrylic acid thus formed was esterified with cyclohexanol, and the resulting ester was reacted with sodium bisulphite to form the sulpho derivative. At a concentration of 0.2%, the compound gave a wetting speed of 20 seconds.

EXAMPLE 36

The salt of the cyclohexyl ester of sec.-butylchlorbenzoyl sulpho propionic acid was prepared following Method B by first condensing sec.-butyl chlorbenzene with maleic anhydride. The sec.-butylchlorbenzoyl acrylic acid thus formed was esterified with cyclohexanol, and the resulting ester was reacted with sodium bisulphite to form the sulpho derivative. At a concentration of 0.05%, the compound gave a wetting speed of 60 seconds.

EXAMPLE 37

The salt of the cyclohexyl ester of nonylbenzoyl (1,3,5 trimethylhexyl benzoyl) sulpho propionic acid was prepared following Method B, by first condensing nonylbenzene (1,3,5 trimethylhexylbenzene) with maleic anhydride. The nonylbenzoyl acrylic acid thus formed was esterified with cyclohexanol, and the resulting ester was reacted with sodium bisulphite to form the sulpho derivative. At a concentration of 0.2%, the compound gave a wetting speed of 25 seconds.

EXAMPLE 38

The salt of the methylcyclohexyl ester of toluoyl sulpho propionic acid was prepared following Method B by first condensing toluene with maleic anhydride. The toluoyl acrylic acid thus formed was esterified with methylcyclohexanol, and the resulting ester was reacted with sodium bisulphite to form the sulpho derivative. At a concentration of 0.2%, the compound gave a wetting speed of 45 seconds.

EXAMPLE 39

The salt of the methyl cyclohexyl ester of sec.-butyl benzoyl sulpho propionic acid was prepared following Method B, by first condensing sec.-butyl benzene with maleic anhydride. The sec.-butyl benzoyl acrylic acid thus formed was esterified with methyl cyclohexyl alcohol, and the resulting ester was reacted with sodium bisulphite to form the sulpho derivative. At a concentration of .05%, it gave a wetting speed of 11 seconds.

EXAMPLE 40

The salt of the methylcyclohexyl ester of phenylbenzoyl sulpho propionic acid was prepared following Method B, by first condensing phenylbenzene with maleic anhydride. The phenylbenzoyl acrylic acid thus formed was esterified with methylcyclohexanol, and the resulting ester was reacted with sodium bisulphite to form the sulpho derivative. At a concentration of 0.1%, the compound gave a wetting speed of 20 seconds.

EXAMPLE 41

The salt of the methylcyclohexyl ester of cyclohexylbenzoyl sulpho propionic acid was prepared following Method B, by first condensing cyclohexylbenzene with maleic anhydride. The cyclohexylbenzoyl acrylic acid thus formed was esterified with methylcyclohexanol, and the resulting ester was reacted with sodium bisulphite to form the sulpho derivative. At a concentration of 0.1%, the compound gave a wetting speed of 65 seconds.

EXAMPLE 42

The salt of the B-phenethyl ester of chlorbenzoyl sulpho propionic acid was prepared following Method B, by first condensing chlorbenzene with maleic anhydride. The chlorbenzoyl acrylic acid thus formed was esterified with B-phenethyl alcohol, and the resulting ester was reacted with sodium bisulphite to form the sulpho derivative. At a concentration of 0.2%, the compound gave a wetting speed of 85 seconds.

EXAMPLE 43

The salt of the B-phenethyl ester of sec.-butylbenzoyl sulpho propionic acid was prepared following Method B, by first condensing sec.-butylbenzene with maleic anhydride. The sec.-butylbenzoyl acrylic acid thus formed was esterified with B-phenethyl alcohol, and the resulting ester was reacted with sodium bisulphite to form the sulpho derivative. At a concentration of .1%, it gave a wetting speed of 32 seconds.

EXAMPLE 44

The salt of the B-phenethyl ester of octylbenzoyl (1-methyl 1-ethyl amylbenzoyl) sulpho propionic acid was prepared following Method B, by first condensing octylbenzene (1-methyl 1-ethyl amylbenzoyl) with maleic anhydride. The octylbenzoyl acrylic acid thus formed was esterified with B-phenethyl alcohol, and the resulting ester was reacted with sodium bisulphite to form the sulpho derivative. At a concentration of 0.3%, the compound gave a wetting speed of 35 seconds.

EXAMPLE 45

The salt of the B-phenethyl ester of phenylbenzoyl sulpho propionic acid was prepared following Method B, by first condensing phenylbenzene with maleic anhydride. The phenylbenzoyl acrylic acid thus formed was esterified with B-phenethyl alcohol, and the resulting ester was reacted with sodium bisulphite to form the sulpho derivative. At a concentration of 0.2%, the compound gave a wetting speed of 40 seconds.

EXAMPLE 46

The salt of the B-phenethyl ester of cyclohexylbenzoyl sulpho propionic acid was prepared following Method B, by first condensing cyclohexylbenzene with maleic anhydride. The cyclohexylbenzoyl acrylic acid thus formed was esterified with B-phenethyl alcohol, and the resulting ester was reacted with sodium bisulphite to form the sulpho derivative. At a concentration of 0.2%, the compound gave a wetting speed of 90 seconds.

EXAMPLE 47

The salt of the B-phenethyl ester of benzoyl sulpho propionic acid was prepared following Method B, by first condensing benzene with maleic anhydride. The benzoyl acrylic acid thus formed was esterified with B-phenethyl alcohol, and the resulting ester was reacted with sodium bisulphite to form the sulpho derivative. At a concentration of 0.3%, the compound gave a wetting speed of 75 seconds.

EXAMPLE 48

*The preparation of the propyl ester of sec. amyl benzoyl sulpho propionic acid, sodium salt*

Amyl benzoyl propionic acid is prepared by condensing 37 grams of sec. amyl benzene with 27 grams of succinic anhydride in 110 cc. of orthodichlorobenzene using .64 gram of anhydrous aluminum chloride as the condensing agent. The sodium salt of the resulting acid is made by adding 5.2 grams of soda ash and 4 grams of water to 24 grams of the acid dissolved in 60 cc. of toluene. The sodium salt is then converted to the propyl ester by the addition of 16.9 grams of dipropyl sulphate at 70° C. After one-half hour, the esterification is complete. The product is isolated after washing by distilling to remove the toluene.

The propyl ester of amyl benzoyl propionic acid is brominated by adding 27 grams of dried bromine to 38 grams of the ester in 50 cc. of carbon tetrachloride, using 0.25 cc. of phosphorus trichloride as a catalyst. The bromine is added dropwise at 50° C. to the ester. Hydrogen bromide is liberated and the reaction is complete in a short time. The solvent is evaporated in vacuo.

The above bromo compound is heated with sodium sulphite to give the sulpho derivative, for example 39 grams of the bromo ester and 27 grams of sodium sulphite in 27 grams of water are refluxed five hours. The mass is diluted with water to give a clear brown solution containing 10% of the product based on the theoretical yield. A portion of the solution was diluted to 0.2% and gave a wetting speed of 50 seconds.

Of the foregoing compounds, the water soluble salts of the octyl ester of butylbenzoyl sulpho propionic acid and more specifically the sodium salt of 2-ethyl hexyl ester of sec. butylbenzoyl sulpho propionic acid or the sodium salt of the n-octyl ester of sec.-butyl benzoyl sulpho propionic acid; and the water soluble salts of the octyl esters of amylbenzoyl sulpho propionic acid, more specifically the sodium salt of the 2-ethyl ester of sec.-amylbenzoyl sulpho propionic acid, are preferred.

I claim:

1. As a surface active agent possessing marked wetting properties, a water soluble salt of a benzoyl sulpho propionic acid ester corresponding to the formula:

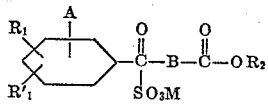

Where $R_1$ is selected from the group consisting of hydrogen, phenyl, cyclohexyl, and alkyl groups containing from 1 to 9 carbon atoms; where $R'_1$ is selected from the group consisting of hydrogen and alkyl groups containing from 1 to 9 carbon atoms when $R_1$ is selected from the group consisting of hydrogen and said alkyl groups, and where $R'_1$ is hydrogen when $R_1$ is selected from the group consisting of phenyl and cyclohexyl radicals; where A is selected from the group consisting of hydrogen and chlorine when $R'_1$ is hydrogen, and is hydrogen when $R'_1$ is said alkyl group; where $R_2$ is selected from the group consisting of alkyl groups containing from 1 to 9 carbon atoms, phenethyl, methylcyclohexyl and cyclohexyl groups; where B is an ethylene group; where M is a cation providing water solubility to the product; and where the total number of carbon atoms of $R_2$ plus carbon atoms in $R_1$ and $R'_1$ is at least 8 but not more than 16.

2. The product of claim 1 wherein M is sodium.

3. As a surface active agent possessing marked wetting properties, a water soluble salt of a benzoyl sulpho propionic acid ester corresponding to the following formula:

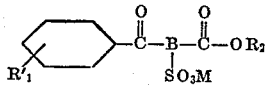

where $R'_1$ is an alkyl group containing from 1 to 9 carbon atoms; where $R_2$ is an alkyl group containing from 1 to 9 carbon atoms; where B is an ethylene group; where M is a cation providing water solubility to the product, and where the total number of carbon atoms supplied by $R_2$ and $R'_1$ is from 10 to 14.

4. The product of claim 3 wherein M is sodium.

5. The product of claim 3 wherein $R'_1$ contains from 3 to 6 carbon atoms; wherein $R_2$ contains from 4 to 9 carbon atoms, and wherein M is sodium.

6. As a surface active agent possessing marked wetting properties, a water soluble salt of an octyl ester of butylbenzoyl sulpho propionic acid.

7. As a surface active agent possessing marked wetting properties, the sodium salt of the 2 ethylhexyl ester of secondary butylbenzoyl sulpho propionic acid.

8. As a surface active agent possessing marked wetting properties, the sodium salt of the normal octyl ester of secondary butylbenzoyl sulpho propionic acid.

9. As a surface active agent possessing marked wetting properties, a water soluble salt of an octyl ester of amylbenzoyl sulpho propionic acid.

10. As a surface active agent possessing marked wetting properties, the sodium salt of the 2-ethylhexyl ester of secondary amylbenzoyl sulpho propionic acid.

11. The method of preparing a surface active agent possessing marked wetting properties which comprises condensing, in a Friedel-Crafts acylation reaction, a phenyl derivative selected from the group consisting of benzene, monochlorbenzene, monoalkylbenzene, monoalkylmonochlorbenzene and dialkylbenzene, the alkyl groups of which contain from 1 to 9 carbon atoms, phenylbenzene, phenylchlorbenzene, cyclohexylbenzene and cyclohexylchlorbenzene with maleic anhydride to form the corresponding benzoyl acrylic acid, esterifying the resulting acid with an esterifying compound providing an ester group selected from the group consisting of an alkyl group containing from 1 to 9 carbon atoms, a benzyl group, a phenethyl group, a methylcyclohexyl group and a cyclohexyl group, said esterifying compound being selected to provide an ester group which supplies, along with carbon atoms supplied by substituted groups on the phenyl nucleus of said phenyl derivative, a total of from 8 to 16 carbon atoms, and reacting the resulting ester with sodium bisulphite at a temperature between about 80° C. to about 110° C. to form the sodium salt of the corresponding benzoyl sulpho propionic acid ester.

GLEN W. HEDRICK.

REFERENCES CITED

The following references are of record in the file of this patent:

Bogert et al.: J. A. C. S., vol. 47, pp. 526–535 (1925).